United States Patent [19]
Nagatsuna et al.

[11] Patent Number: 6,124,014
[45] Date of Patent: *Sep. 26, 2000

[54] PRODUCT INCLUDING PARTS WHICH CAN BE RECYCLED

[75] Inventors: Shinji Nagatsuna, Tokyo; Tatsuo Tani, Urayasu, both of Japan

[73] Assignee: Ricoh Company, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/686,069

[22] Filed: Jul. 24, 1996

[51] Int. Cl.⁷ ........................................ B32B 3/00
[52] U.S. Cl. .............................. 428/78; 428/77; 428/187; 428/195; 428/411.1; 428/903.3
[58] Field of Search ..................... 428/913, 914, 428/195, 204, 411.1, 77, 78, 903.3, 187; 427/105

[56] References Cited

U.S. PATENT DOCUMENTS

| | | |
|---|---|---|
| 4,627,707 | 12/1986 | Tani et al. . |
| 4,794,420 | 12/1988 | Ohashi et al. . |
| 4,876,572 | 10/1989 | Nagatsuna . |
| 4,926,358 | 5/1990 | Tani et al. . |
| 4,989,037 | 1/1991 | Nagatsuna . |
| 5,029,833 | 7/1991 | Tani et al. . |
| 5,144,385 | 9/1992 | Tani . |
| 5,166,738 | 11/1992 | Tani . |
| 5,172,179 | 12/1992 | Tani et al. . |
| 5,418,607 | 5/1995 | Tani . |

FOREIGN PATENT DOCUMENTS 8-34088  2/1996  Japan .

OTHER PUBLICATIONS

English Language Translation of JP 08–34088, Feb. 6, 1996.

*Primary Examiner*—Marie Yamnitzky
*Attorney, Agent, or Firm*—Oblon, Spivak, McClelland, Maier & Neustadt, P.C.

[57] ABSTRACT

A product including parts which can be recycled is disclosed. A front door, for example, included in the product is formed of thermoplastic resin. Decals are respectively adhered to the front and the rear of the front door, and each is made of thermoplastic resin soluble to the resin constituting the door. A mark showing that the front door can be recycled without peeling off the decals is provided on each decal. A sheet-like member showing the meaning of the mark is adhered to the rear of the front door.

9 Claims, 4 Drawing Sheets

You can recycle a part having a sheet with this mark without peeling off the sheet.

7

7a

Please shake a new toner bottle before mounting it.

You can recycle a part having a sheet with this mark without peeling off the sheet.

PLEASE SHAKE A NEW TONER BOTTLE BEFORE MOUNTING IT.

YOU CAN RECYCLE WITHOUT PEELING OFF THIS SHEET.

PRODUCT INCLUDING PARTS WHICH CAN BE RECYCLED

BACKGROUND OF THE INVENTION

1. Field of the Invention

The present invention relates to a product including parts which are formed of thermoplastic resins and can be recycled.

2. Discussion of the Background

Today, various kinds of products including printers, facsimile apparatuses and other image forming apparatuses and electronic apparatuses are extensively used. It is a common practice to adhere sheet-like pieces called decals to such products. Decals are implemented as, e.g., flexible or rigid thin sheets, films or thin plates formed of resins. Particular information is indicated on the front of each decal. Decals adhered to the various parts of a copier, for example, show the user or a serviceman how the parts should be handled, numbers indicative of how the parts should be replaced, and other various information. For the information, use is made not only of characters but also of arrows and other symbols, figures, and colors.

There is an increasing demand for products which can be easily recycled in order to protect the environment and to further enhance the effective use of limited resources. Various products have their parts formed of thermoplastic resins, so that the parts can be recycled when the lives of the products expire. For example, the parts are broken into pellets by a shredder, melted by hear, and then molded to produce desired parts.

Assume that a decal adhered to a part which can be recycled is formed of a material insoluble to the material constituting the part. Then, when the part with the decal is broken into pieces and melted without the decal peeled off, they do not dissolve in each other. The resulting molding has mechanical strength which is too low to withstand practical use. This problem will be solved if the decal is removed from the part by, e.g., a grinder and then recycled independently of the part. However, such a procedure is time- and labor-consuming and thereby increases the recycling cost.

In light of the above, Japanese Patent Application No. 6-192152 proposes to form parts and decals of thermoplastic resins soluble to each other, and to indicate on the decals character messages showing that the parts can be recycled without peeling off the decals. This kind of scheme allows the reproduced moldings to have sufficient mechanical strength because the materials of the parts and decals are soluble to each other. In addition, the messages provided on the decals allow recycling traders to immediately see that the parts should be dealt without peeling off the decals, thereby enhancing efficient recycling operation.

However, the above prior art scheme has some problems yet to be solved, as follows. The messages provided on the decals may read as "You can recycle a part with this sheet without peeling off the sheet". However, how the parts should be handled, the numbers indicative of how the parts should be replaced, and other primary information are indicated on the decals. Therefore, when the decals are relatively small in size, it is likely that they cannot accommodate the message showing the traders that the decals do not have to to be peeled off.

The information indicated on the decals are sometimes implemented as symbols or pictures, as distinguished from characters, so that they can be understood in any country. For example, information relating to the handling of the product may be represented by pictures so as to be understood in any country. This makes it needless to prepare particular decals for each country and thereby reduces the production cost of the decals. In this sense, the message "You can recycle a part with this sheet without peeling off the sheet" provided on the decals in English is meaningless.

As stated above, although forming the decals and parts of materials soluble to each other and indicating on the decals the character message showing that the parts can be recycled without peeling off the decals is useful, such a message cannot sometimes be indicated.

SUMMARY OF THE INVENTION

It is therefore an object of the present invention to provide a product capable of showing recycling traders that its parts can be recycled, without resorting to a character message heretofore provided on decals.

In accordance with the present invention, a product including a part formed of thermoplastic resin and capable of being recycled has a decal adhered to the part and formed of thermoplastic resin soluble to the thermoplastic resin constituting the part. A mark showing that the part can be recycled without the decal peeled off from the part is indicated on the decal. An indicating member indicates the meaning of the mark.

Also, in accordance with the present invention, a product including a part formed of thermoplastic resin and capable of being recycled has a decal adhered to the part and formed of thermoplastic resin soluble to, but different from, the thermoplastic resin constituting the part. A mark showing that the part can be recycled without the decal peeled off from the part is indicated on the decal. An indicating member indicates the meaning of the mark.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENT

Figure 1:
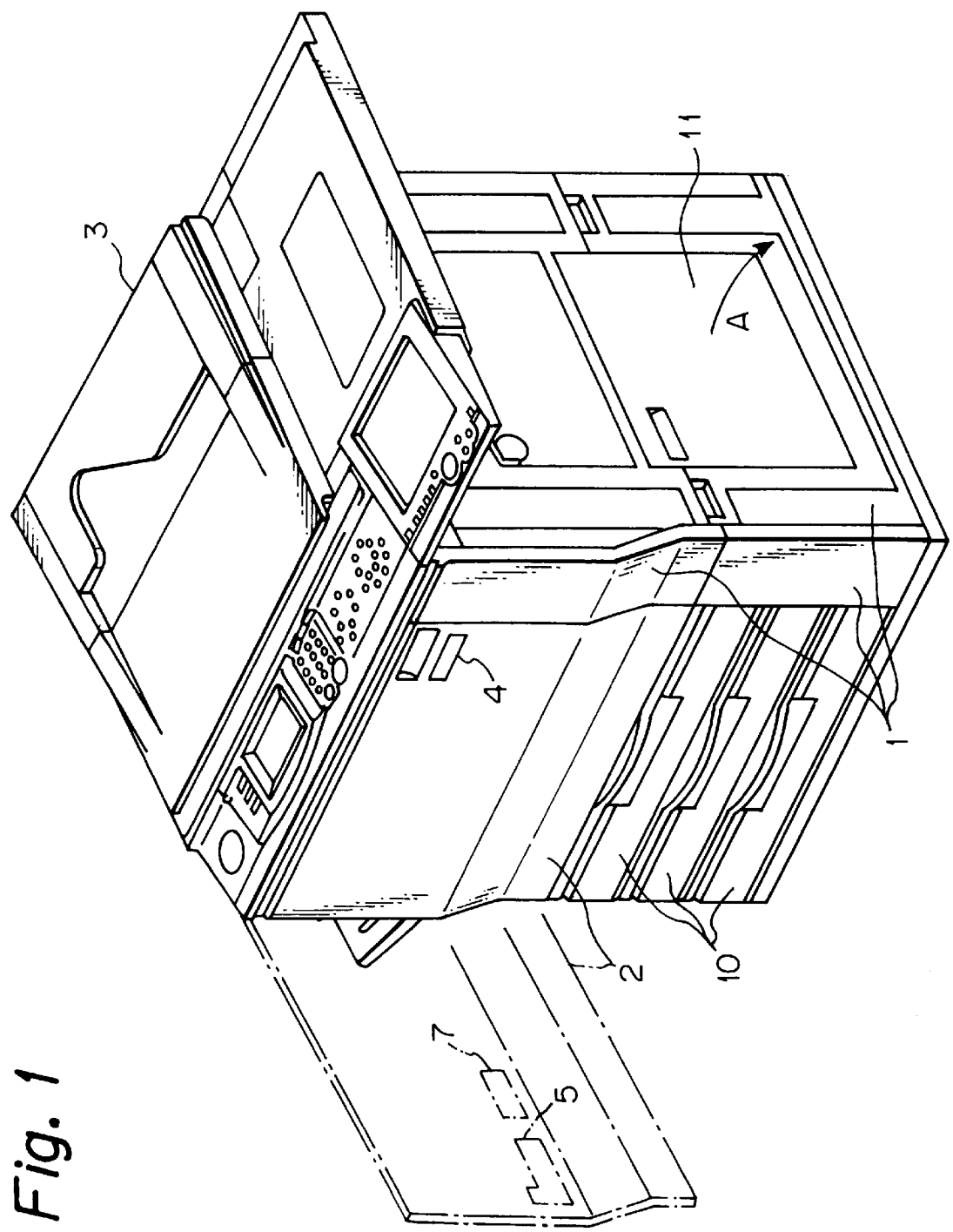
FIG. 1 is an external perspective view of a product embodying the present invention.

Referring to FIG. 1 of the drawings, a product embodying the present invention is shown and implemented as a copier by way of example. As shown, the copier includes covering parts 1, a front door 2 openably hinged to a frame, not shown, included in the copier body, a cover plate 3 mounted on the top of the copier body, paper trays 10, a paper transport section 11, and various members, not shown, arranged in the copier body. The paper transport section 11 allows papers, not shown, to be sequentially fed from any one of the paper trays 10 upward to all image transfer station, not shown. The illustrative embodiment will be described, taking the front door 2 as an example of the part which can be recycled.

The front door 2 is supported by the frame in such a manner as to be rotatable between a closed position and an open position indicated by a solid line and a phantom line, respectively. At least one decal is adhered to the part constituting the door 2. In the specific configuration shown in FIG. 1, a first decal 4 and a second decal 5 are respectively adhered to the front and the rear of the door 2. The decals 4 and 5 are implemented as flexible or rigid sheets, films or thin plate-like pieces. Preselected information is indicated on the front of the decals 4 and 5.

Figure 2:
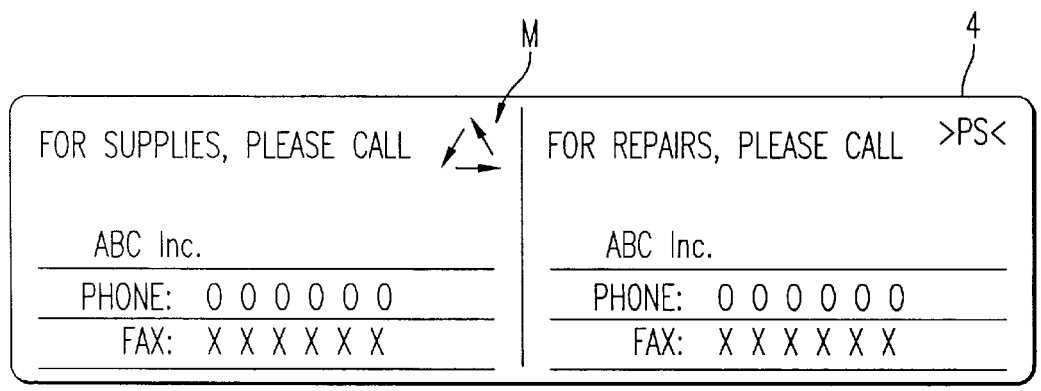
FIG. 2 is a front view of a first decal adhered to a front door included in the product shown in FIG. 1.
Figure 3:
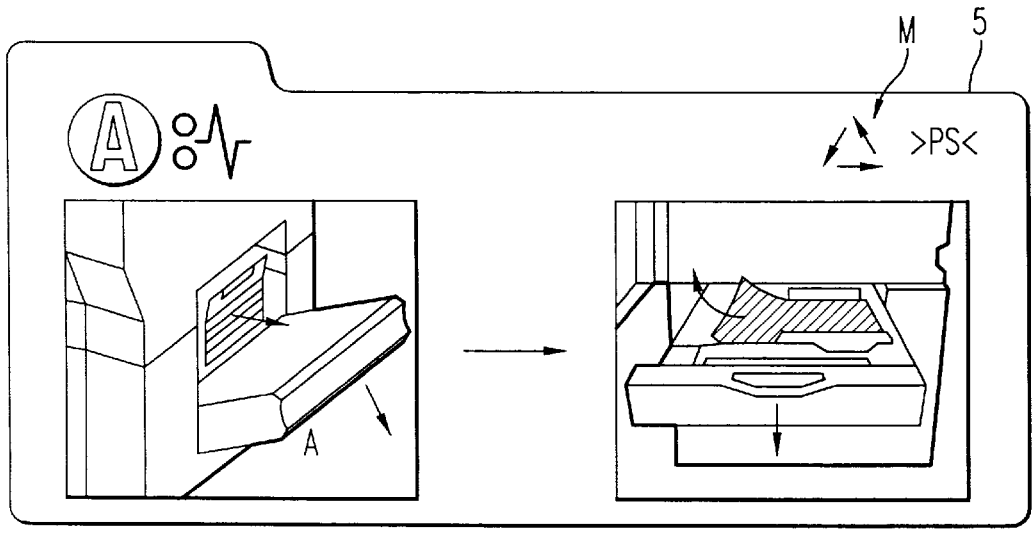
FIG. 3 is a front view of a second decal adhered to the front door.

FIGS. 2 and 3 show specific information indicated on the decals 4 and 5, respectively. The information on the decal 4 shows a supplies distributor and a service station for repair. The information on the decal 5 shows graphically a procedure for dealing with a jamming paper. Assume that a paper has jammed the paper transport section 11. Then, the operator opens the front door 2, opens the paper transport section 11 in a direction A, and then removes the jamming paper, as guided by the decal 5. If no sheets are present in the above section 11, then the operator pulls out any of the trays 10, as also guided by the decal 5.

When the life of the copier ends, it is transported from the user's station to a trader's station for recycling and is knocked down there. Reclaimable parts included in the dismantled copier are recycled. To facilitate recycling, the front door 2 which is a specific part of the copier is formed of thermoplastic resin. The decals 4 and 5 adhered to the door 2 are also formed of thermoplastic resin. In addition, the resin constituting the door 2 and the resin constituting the decals 4 and 5 are soluble to each other.

The door 2 with the decals 4 and 5 is directly broken into, e.g., 5 mm square pellets by a shredder or similar apparatus, not shown. When the pellets are melted by heat, the resin constituting the door 2 and the resin constituting the decals 4 and 5 evenly dissolve in each other. By molding the resin mixture in a desired configuration, it is possible to produce a recycled part withstanding a long time of use.

The covering parts 1 and front door 2 are in many cases formed of PS (polystyrene), PPE (polyolefin ether), ABS (acryl butadien styrene), PPO (polyphenyl oxide) or a similar thermoplastic resin. The decals 4 and 5 adhered to the front door 2 should preferably be formed of the following materials.

For the door 2 formed of PS, the decals 4 and 5 may advantageously be formed of PC (polycarbonate) or PMMA (metacryl resin) soluble to PS or may also be formed of PS. For the door 2 formed of PPE, the decals 4 and 5 may advantageously be formed of PS, PET (polyethylene terephthalate, ABS, PC or PMMA soluble to PS or may also be formed of PPE. For the door 2 formed of ABS, the decals 4 and 5 may advantageously be formed of PS, PET, PC or PMM soluble to ABS or may be also formed of ABS. Further, for the door 2 formed of PPO, the decals 4 and 5 may advantageously be formed of PS or ABS soluble to PPO or may also be formed of PPO.

Figure 4:
FIG. 4 is a front view of a sheet-like member adhered to the rear of the front door.

Labels showing the materials of decal may also be indicated on the decals. In FIGS. 2 and 4, a label "PS" is printed on the decals 4 and 5 by way of example.

The door 2 and the decals 4 and 5 are formed of the above specific thermosetting resins soluble to each other. Therefore, despite that the door 2 is recycled without the decals 4 and 5 peeled off, the resulting product has a sufficient mechanical characteristic including mechanical strength (bending strength and strength against impacts). This successfully reduces the recycling cost and therefore the cost of the recycled product.

The thermoplastic resins constituting the door 2 and decals 4 and 5, respectively, are soluble to each other, as stated above. This means that the two kinds of resins are soluble to each other to such a degree that the recycled product or molding will have a characteristic capable of withstanding practical use.

The decals 4 and 5 can be adhered to the door 2 by thermal bonding because the former and latter are formed of thermoplastic resins soluble to each other. This eliminates the need for adhesive. Assume that the decals 4 and 5 are adhered to the door 2 by adhesive. Then, the solubility of the door 2 and decals 4 and 5 to each other is not an important consideration because the amount of the adhesive used is extremely small. However, the adhesive should preferably be implemented by thermoplastic resin soluble to the resins constituting the door 2 and decals 4 and 5; that is, the adhesive is formed of resin soluble to both the part and the decals. As a result, when the door 2 or similar part is broken into pellets and melted without the decals 4 and 5 peeled off, the solubility of the entire body including the adhesive is further enhanced. This prevents the characteristic of the recycled molding from being lowered more positively.

For the adhesive for adhering the door 2 and decals 4 and 5, use may be made of PMMA highly soluble to PS, PPE, ABS or a similar resin. Therefore, when the adhesive is implemented by PMMA, it is preferable that the door and decals 4 and 5 be formed of PS, PPE or ABS by way of example.

While the door 2 with the decals 4 and 5 can be recycled without the decals 4 and 5 peeled off, it is necessary to inform a recycling trader of the above fact. For this purpose, a message "You can recycle a part with this sheet without peeling it off" or similar message may be provided on the decals 4 and 5. However, such a message cannot sometimes be provided on the decals 4 and 5. For example, an area broad enough to accommodate the above message is not available with the relatively small decal 4 shown in FIG. 2. The information provided on the decal 5 shown in FIG. 3 is implemented as pictures and symbols so as to be understood in various countries. In this case, printing the above message in, e.g., English is not adequate.

In light of the above, a mark labeled M in FIGS. 2 and 3 is printed on each of the decals 4 and 5. The mark M indicates that the part 2 can be recycled without peeling off the decals 4 and 5. However, the problem is that not all the recycling traders can understand the meaning of the mark M. To solve this problem, an indication member indicative of the meaning of the mark M is provided on the copier shown in FIG. 1. Specifically, as shown in FIGS. 1 and 4, the indication member is implemented as a sheet-like member 7 on which the meaning of the mark M is indicated. Indicated on the sheet 7 are the mark M and an English message "You can recycle a part having a sheet with this mark without peeling off the sheet".

The sheet 7 allows a recycling trader to readily recycle the door 2 without peeling off the decals 4 and 5, as instructed by the sheet 7 and marks M printed on the decals 4 and 5. Of course, the message may be printed on the sheet 7 in, e.g., Japanese, German or French or a combination thereof.

Decals with marks M may also be adhered to various parts other than the door 2. Usually, a number of decals with marks M are adhered to a single copier. However, with the single sheet 7, for example, it is possible to inform the recycling trader of the meaning of the mark M indicated on each decal.

The sheet-like member 7 adhered to the copier 1 as shown in FIGS. 1 and 4 may be replaced with, e.g., a card-like member hung down in the copier. However, the sheet-like member 7 is advantageous over the card-like member in that it is prevented from being lost until the life of the copier expires.

The decals 4 and 5 and sheet-like member 7 with the marks M may each be adhered to a particular part of a single part which can be recycled, e.g., the front door 2. This allows the trader to understand the meaning of the mark M easily and immediately, thereby promoting an efficient recycling procedure.

When the decals 4 and 5 and sheet-like member 7 are adhered to a single part, e.g., the front door 2, it is preferable that the member 7 and adhesive for adhering it to the door 2 be also formed of thermoplastic resins soluble to the resin constituting the door 2. Then, the door 2 can be recycled without peeling off the member 7, turning out a high quality molding.

Figure 5:
FIGS. 5 and 6 are front views each showing another configuration of the sheet-like member.

FIG. 5 shows an alternative sheet-like member 7a. As shown, not only the meaning of the mark M but also other information are printed on the member 7a. In FIG. 5, the additional information urges the operator to shake a new toner bottle, not shown, before mounting it to a developing device, not shown, included in the copier body. The member 7a is adhered to, e.g., the rear of the door 2 in place of the member 7. The member 7a not only shows the trader the meaning of the mark M, but also plays the role of a decal showing, e.g., how the component part of the copier should be used. This kind of configuration is lower in cost than the configuration having a sheet-like member and a decal separate from each other. Again, it is preferable that the member 7a and adhesive for adhering it to the door 2 or similar part be also formed of thermoplastic resins soluble to the resin constituting the door 2. Then, the door 2 can be recycled without peeling off the member 7a, turning out a high quality molding.

Figure 6:

FIG. 6 shows a sheet-like member 7b on which another specific message is provided to show that the part can be recycled without peeling off the member 7b. The message indicated on the member 7b is simpler than the message indicated on the member 7 or 7a.

Figure 7:
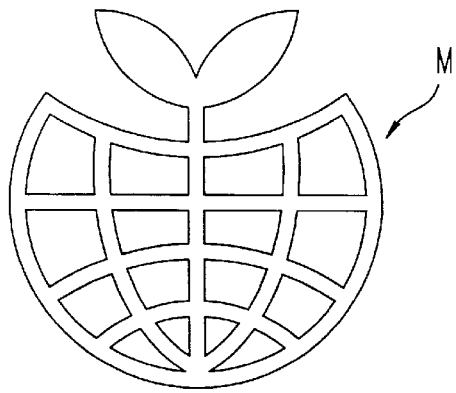
FIG. 7 shows an alternative mark applicable to the embodiment.

In FIGS. 2–6, the mark M is implemented as three arrows arranged in a triangle. This is, of course, only illustrative and may be replaced with any other suitable mark. FIG. 7 shows another specific mark M. The mark M shown in FIG. 7 will be indicated on the decals 4 and 5 or the sheet-like member 8, 7a or 7b.

Figure 8:
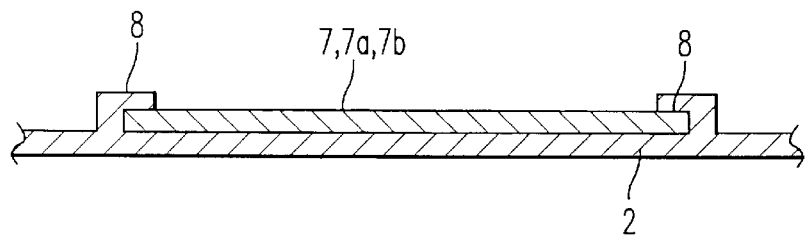
FIG. 8 is a section showing the sheet-like member removably attached to the front door.

If desired, the sheet-like member 7, 7a or 7b may be attached to at least one of the front door 2 with the decals 4 and 5 and another part such that it can be easily removed. Specifically, FIG. 8 shows a pair of rails or holding members 8 provided on the rear of the door 2. The sheet-like member 7, 7a or 7b is removably held by the rails 8. In this case, the member 7, 7a or 7b can be readily removed from the rails 8. Therefore, the member 7, 7a or 7b can be implemented as, e.g., a thick paper or a metal plate not soluble to the material of the door 2. This broadens the range of materials applicable to the member 7, 7a or 7b.

The sheet-like member 7, 7a or 7b may be located at any suitable position of the copier or similar product and including an outer periphery. When the member 7, 7a or 7b is provided on the inner periphery of the product, it is not visible from the outside so long as the product is used in ordinary conditions. This provides the product with desirable appearance. In the specific configuration shown in FIG. 1, the sheet 7, 7a or 7b is positioned on the rear of the front door 2 and is not visible when the door 2 is closed.

In the illustrative embodiment, the indication member is implemented as the sheet-like member 7, 7a or 7b showing the meaning of the mark M. Alternatively, the meaning of the mark M may be directly indicated on at least one of a part with decals having the marks M and another part. For example, a term "Mark M" and a message "You can recycle a part having a sheet with this mark without peeling off the sheet" or "You can recycle without peeling off this sheet" can be directly indicated on the rear of the door 2 to which the decals 4 and 5 are adhered. Specifically, a resin sheet on which the above information are provided by hard coating or printing may be molded integrally with the door 2 or a similar part formed of resin. Alternatively, the above information may be printed by stamping. This kind of scheme eliminates the need for the exclusive sheet-like member 7, 7a or 7b and thereby reduces the cost of the product. When the sheet 7a or 7b is not used, the message "Please shake a new toner bottle before mounting it to the developing device" will be provided on another decal.

Further, the meaning of the mark M may be indicated by molding on at least one of the door 2 with the decals 4 and 5 or a similar part to be recycled and another part formed of resin. This also eliminates the need for the exclusive sheet-like member 7, 7a or 7b and thereby reduces the cost of the product. For example, when the door 2 is molded, the meaning of the mark M is engaged in the rear of the door 2 by a mold.

While the illustrative embodiment has concentrated on a copier, the present invention is similarly applicable to any other product including parts which can be recycled, e.g., any other electronic part, automobile or container.

In summary, it will be seen that the present invention provides a product including parts which can be recycled and having the following unprecedented advantages.

(1) Even when the parts are recycled without decals peeled off therefrom, reproduced products have a sufficient characteristic. Moreover, it is possible to show recycling traders that they can recycle the parts without peeling off the decals, without indicating it on the decals.

(2) Not only the decals but also a sheet-like member does not have to be peeled off from the parts in the event of recycling. This also insures high quality recovery.

(3) Because the sheet-like member plays the role of a decal, the total cost is reduced.

(4) The sheet-like member can be formed of a material selected from a broad range of materials.

(5) The sheet-like member does not impair the appearance of the product.

(6) Even if the sheet-like member is omitted, it is possible to show recycling traders that they can recycle the parts without peeling off the decals, thereby reducing the cost.

Various modifications will become possible for those skilled in the art after receiving the teachings of the present disclosure without departing from the scope thereof.

What is claimed is:

1. A product including a part formed of a first thermoplastic resin and capable of being recycled, comprising:
   a decal adhered to said part and the decal being formed of a second thermoplastic resin which in recycling evenly dissolves in and is thereby recyclable with the first thermoplastic resin constituting said part, and wherein the decal includes a mark showing that said part can be recycled without said decal peeled off from said part; and indicating means formed separate from said decal for indicating a meaning of said mark, wherein said indicating means is formed of one of the group consisting of an embossing, an engraving, and a stamping.

2. A product including a part formed of a first thermoplastic resin and capable of being recycled, comprising:

a decal adhered to said part and the decal being formed of a second thermoplastic which in recycling evenly dissolves in and is thereby recyclable with, but different from, the first thermoplastic resin constituting said part, and wherein the decal includes a mark showing that said part can be recycled without said decal peeled off from said part; and indicating means formed separate from said decal for indicating a meaning of said mark, wherein said indicating means is formed of one of the group consisting of an embossing, an engraving, and a stamping.

3. A product including a plurality of parts, at least one of which is formed of thermoplastic resin and capable of being recycled, comprising:

a decal adhered to said at least one of said plurality of parts and formed of thermoplastic which in recycling evenly dissolves in and is thereby recyclable with the thermoplastic resin constituting said part, and wherein the decal includes a mark showing that said at least one of said plurality of parts can be recycled without said decal peeled off from said at least one of said plurality of parts; and an indicating portion provided on said product by molding said at least one of said plurality of parts and indicating information relating to said mark, wherein said indicating portion is formed of one of the group consisting of an embossing, an engraving, and a stamping.

4. A product as claimed in claim 3, wherein said part comprises a cover of said product, and wherein said indicating portion is provided on an inside of said cover.

5. A product as claimed in claim 3, wherein said decal comprises a plurality of decals.

6. A product as claimed in claim 3, wherein said part and said decal each is formed of a same material.

7. A product as claimed in claim 3, wherein a material forming said decal is different from a material forming said part.

8. An article including a plurality of parts, at least one part of said plurality of parts being formed of thermoplastic resin and being capable of being recycled, comprising:

a decal adhered to said at least one part and said decal being formed of thermoplastic resin and which in recycling evenly dissolves in the thermoplastic resin constituting said at least one part and which is thereby recyclable with said at least one part, wherein a mark is provided on the decal, a meaning of said mark being to indicate that said at least one part may be recycled without removing the decal from said at least one part, and an indicating portion is formed on one of said plurality of said parts and indicating multilingually the meaning of the mark, wherein said indicating portion is formed of one of the group consisting of an embossing, an engraving, and a stamping.

9. An article including a plurality of parts, at least one part of said plurality of parts being formed of thermoplastic resin and being capable of being recycled, comprising:

a decal adhered to said at least one part and said decal being formed of thermoplastic resin and which in recycling evenly dissolves in the thermoplastic resin constituting said at least one first part and which is thereby recyclable with said at least one first part;

a mark provided on the decal, a meaning of said mark indicating that said at least one first part may be recycled without removing the decal from said at least one first part; and an indicating portion formed on a second of said plurality of said parts other than said at least one first part, and indicating the meaning of the mark, wherein said indicating portion is formed of one of the group consisting of an embossing, an engraving, and a stamping.

* * * * *